(12) United States Patent
Ouvrier Buffet (10) Patent No.: US 9,696,432 B2
(45) Date of Patent: Jul. 4, 2017

(54) DEVICE FOR PROCESSING A SIGNAL DELIVERED BY A RADIATION DETECTOR

(71) Applicant: Commissariat à l'Énergie Atomique et aux Énergies Alternatives, Paris (FR)

(72) Inventor: Patrice Ouvrier Buffet, Saint-Jorioz (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 24 days.

(21) Appl. No.: 14/771,088

(22) PCT Filed: Feb. 27, 2014

(86) PCT No.: PCT/FR2014/050435
§ 371 (c)(1),
(2) Date: Aug. 27, 2015

(87) PCT Pub. No.: WO2014/132003
PCT Pub. Date: Sep. 4, 2014

(65) Prior Publication Data
US 2016/0003951 A1    Jan. 7, 2016

(30) Foreign Application Priority Data
Feb. 28, 2013   (FR) ..................................... 13 51803

(51) Int. Cl.
  *G01T 1/17*   (2006.01)
(52) U.S. Cl.
  CPC ..................... *G01T 1/17* (2013.01)

(58) Field of Classification Search
CPC .. G01T 1/17; G01T 1/247; G01T 1/24; G01T 1/241; G01T 1/2928; G01T 1/171;
(Continued)

(56) References Cited

U.S. PATENT DOCUMENTS 5,225,682 A      7/1993  Britton, Jr. et al.
7,576,326 B2 *   8/2009  Eames .................. G01T 1/1644
                                                          250/370.09

(Continued)

FOREIGN PATENT DOCUMENTS

FR        2 977 328         1/2013
WO        WO 03/040757 A2   5/2003

OTHER PUBLICATIONS

Written Opinion, dated Apr. 17, 2014, from corresponding International Application No. PCT/FR2014/050435.
(Continued)

*Primary Examiner* — John Lee
(74) *Attorney, Agent, or Firm* — Wolf, Greenfield & Sacks, P.C.

(57) ABSTRACT

The invention relates to a device for processing information delivered by a photon detector, comprising: an analogue circuit for generating a signal comprising a series of pulses, each pulse having an amplitude proportional to the energy freed by an interaction of a photon in the detector; an analogue circuit for determining the instant at which the amplitude of a pulse of the signal is maximal; and an element for capturing the value of the signal at said instant.

20 Claims, 5 Drawing Sheets

(58) Field of Classification Search
CPC ....... G01T 1/18; G01J 2001/4238; G01J 1/44; G01J 3/2803; H03K 5/1532; G01R 19/04
See application file for complete search history.

(56) References Cited

U.S. PATENT DOCUMENTS

| | | | | |
|---|---|---|---|---|
| 8,085,033 | B2* | 12/2011 | Van Oevelen | G01R 19/175 |
| | | | | 324/76.77 |
| 8,340,377 | B2* | 12/2012 | McFarland | A61B 6/032 |
| | | | | 250/363.03 |
| 9,329,283 | B2* | 5/2016 | Rostaing | G01T 1/241 |
| 2005/0246140 | A1 | 11/2005 | O'Connor et al. | |
| 2010/0207027 | A1 | 8/2010 | Marks et al. | |
| 2013/0168562 | A1 | 7/2013 | Brambilla et al. | |
| 2016/0003951 | A1* | 1/2016 | Ouvrier Buffet | G01T 1/17 |
| | | | | 250/206 |

OTHER PUBLICATIONS

International Search Report from corresponding International Application No. PCT/FR2014/050435 mailed Aug. 5, 2014.

* cited by examiner

DEVICE FOR PROCESSING A SIGNAL DELIVERED BY A RADIATION DETECTOR

CROSS REFERENCE TO RELATED APPLICATIONS

This application is a national stage filing under 35 U.S.C. §371 of International PCT Application PCT/FR2014/050435, filed Feb. 27, 2014, entitled "DEVICE FOR PROCESSING A SIGNAL DELIVERED BY A RADIATION DETECTOR," which claims priority to French Application No. 13/51803, filed Feb. 28, 2013, each of which applications are incorporated herein by reference to the maximum extent allowable by law.

The present patent application claims the priority benefit of French patent application FR13/51803 which is herein incorporated by reference.

BACKGROUND

The present disclosure relates to devices for measuring ionizing radiations by means of a detector, for example, formed on a semiconductor material. More particularly, the present disclosure relates to an electronic circuit capable of efficiently processing the data originating from such a detector.

DISCUSSION OF THE RELATED ART

Detectors capable of detecting an ionizing radiation, and in particular a radiation formed of energetic photons, for example, X- or gamma rays having an energy in the range from 1 keV to a few MeV, are here considered.

Such detectors may be scintillation detectors (for example, based on NaI, CsI, LaBr3) or semiconductor detectors (for example based on Ge, Si, CdTe, CdZnTe). It is known that when a particle interacts in such a detector, charges can be collected across the detector, their quantity depending on the energy lost by the particle during the interaction with the material.

For example, in the case of a scintillation detector, the interaction of a particle generates visible photons which can be converted into electric charges by photodetectors. In the case of a semiconductor-based detector, the interaction of a particle generates electron-hole pairs. It is then possible to collect the electrons across an anode, or holes across a cathode.

Such detectors have many applications, particularly in medical imaging, luggage control, or the nuclear industry. For such applications, a spectrometry is currently implemented: the electronic system associated with the detector is provided to classify the detected interactions according to the energy released into the detector material for each interaction. An energy spectrum which represents the number of detected interactions according to the energy is thus obtained.

A photon detector is often formed of a pixel array, each pixel comprising a photodetection area. Each pixel is associated with an electronic system for processing and counting the photons detected by the associated photodetection area.

In known spectrometers, it is current to associate with a detector an electronic device for shaping the received signal, the output of this electronic device being connected to the input of an analog-to-digital converter. The digital signal at the converter output is then processed by a circuit capable of determining the amplitude of each pulse, this amplitude being generally proportional to the power released by the interaction having generated this amplitude. The circuit then creates a histogram of the number of pulses detected according to their amplitude, which corresponds to the energy spectrum of the detected radiation.

When the detector is submitted to an intense incident radiation, due to the high frequency of photon reception on each of the pixels of the photodetector, known devices require particularly high-performance analog-to-digital converters, associated with processing circuits which may for example be microprocessors, programmable logic circuits (FPGA, "Field Programmable Gate Array"), or specific integrated circuits (ASIC, "Application Specific Integrated Circuit").

The use of such particularly high-performance devices implies very high detector manufacturing costs. Further, the use of fast and high-performance analog-to-digital converters is not compatible with the forming of detectors having small surface areas.

SUMMARY

An object of an embodiment is to provide an efficient energy ray detector capable of being integrated within a small volume.

Thus, an embodiment provides a device for processing data delivered by a photon detector, comprising: an analog circuit capable of generating, on a first node, a first signal having a series of pulses, each pulse having an amplitude proportional to the energy released by an interaction of a photon in the detector; an analog circuit for determining the time at which the amplitude of a pulse of the first signal is maximum, this circuit being capable of providing a second signal switching from a first state to a second state when the first signal crosses a maximum value; and a capture element comprising a plurality of capacitors each having a first electrode connected to the first node via a write switch and a second electrode connected to a node of application of a reference voltage, the capture element further comprising a control circuit receiving the second signal, this circuit being capable of controlling the write switches to record the value of the first signal into one of the capacitors when the second signal switches from the first to the second state.

According to an embodiment, the capacitors each have their first electrode connected to a second node via a read switch.

According to an embodiment, the device further comprises an analog-to-digital converter capable of receiving a value provided on the second node.

According to an embodiment, the control circuit is capable of controlling the switches to periodically provide on the second node one of the values recorded into the capacitors.

According to an embodiment, an occupancy indicator is associated with each capacitor of the capture element.

According to an embodiment, the control circuit is capable of controlling the write switches to record the value of the first signal into one of the capacitors associated with an occupancy indicator in a free state, when the second signal switches from the first to the second state.

According to an embodiment, the control circuit is capable of operating the capacitors as a FIFO-type queue.

According to an embodiment, the determination circuit comprises a subtractor having its inputs receiving the first signal and the first signal delayed by a predetermined time by a delay line, the output of the subtractor being connected to a first input of a comparator having a second input receiving a reference voltage.

According to an embodiment, the predetermined time is shorter than 10 ns.

According to an embodiment, the output of the operational amplifier delivers the second signal.

Further, an embodiment provides a device for processing data provided by a photon detector, comprising: an analog circuit for generating a signal having a series of pulses, each pulse having an amplitude proportional to the energy released by an interaction of a photon in the detector; an analog circuit for determining the time at which the amplitude of a pulse of the signal is maximum; and an element for capturing the value of the signal at this time.

According to an embodiment, the capture element comprises at least one memory cell.

According to an embodiment, the device further comprises an analog-to-digital converter capable of receiving a value captured by the capture element.

According to an embodiment, the determination device comprises a subtractor having its inputs receiving the signal and the signal delayed by a predetermined delay by a delay line, the output of the subtractor being connected to a first input of a comparator having a second input receiving a reference voltage.

According to an embodiment, the predetermined delay is shorter than 10 ns.

According to an embodiment, the output of the operational amplifier is associated with a device for controlling the writing into and the reading from the capture element.

According to an embodiment, the capture element comprises a capacitor having a first terminal connected to a fixed voltage, for example, the ground, and having a second terminal connected to a write switch and a read switch controlled by the control device.

According to an embodiment, the capture element comprises an assembly of memory cells, the signal being written at each of the times into a free memory cell of the assembly.

According to an embodiment, each memory cell is associated with an occupancy indicator.

An embodiment further provides a device for processing data provided by a photon detector, comprising: an analog circuit for generating an energy signal having a series of pulses, each pulse having an amplitude proportional to the energy released by an interaction of a photon in the detector; an analog circuit for determining a capture time according to the time variation of the energy signal; and a circuit for capturing the value taken by the energy signal at the capture time.

According to an embodiment, the device further comprises a first switch connecting the signal generation circuit to the capture circuit.

According to an embodiment, the analog circuit for determining the capture time is capable of determining the time variation of the energy signal and of comparing the time variation with a predetermined value, to transmit a control signal depending on this comparison.

According to an embodiment, the capture time corresponds to the time at which the value of the energy signal reaches a maximum.

According to an embodiment, the first switch is arranged between the capture circuit and the analog signal generation circuit, the switch being capable of being turned off at the capture time.

According to an embodiment, the capture circuit comprises a memory cell at which the value of the energy signal is stored at the capture time.

According to an embodiment, the memory cell is an analog memory cell and comprises, in particular, a capacitance arranged between the first switch and a second read switch.

According to an embodiment, the capture circuit comprises a plurality of memory cells arranged in parallel.

According to an embodiment, the device further comprises an analog-to-digital converter arranged to receive a value stored in the memory cell.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings.

DETAILED DESCRIPTION

Ionizing radiation spectrometry comprises measuring with the greatest possible accuracy the energy of each interaction of the radiation in a detector and then plotting the energy spectrum of the detected interactions.

Although it will here be spoken of an X- or gamma-ray type ionizing radiation, it may also be another type of radiation, for example, $\alpha$ or $\beta$.

Figure 1:
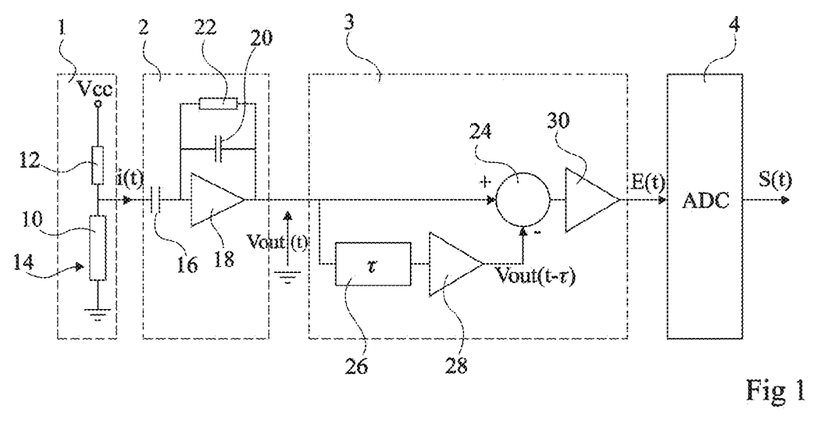
FIG. 1 is a simplified view of a spectrometer.

FIG. 1 schematically illustrates a spectrometer comprising an energy photon detection system associated with an electronic circuit.

This system comprises a photon detection device 1, a local electronic circuit 2 which converts the current signal delivered by detection device 1 into a voltage signal, an electronic processing circuit 3 (filtering, amplifier . . . ) which processes the signal delivered by local electronic circuit 2, and an analog-to-digital converter 4 (ADC) which digitizes the analog signals delivered by electronic circuit 3. The signal originating from converter 4 is then used to obtain the spectrometer corresponding to the incident photons.

Photon detector 1 comprises a block of semiconductor material 10 connected to a terminal of application of a power supply voltage Vcc via a resistor 12.

It should be noted that block of semiconductor material 10 illustrated in FIG. 1 may in practice correspond to a pixel of an array of elementary photon detectors formed on a semiconductor wafer. In each pixel of this array, a portion of the semiconductor material is provided to collect charges photogenerated by an incident ionizing beam 14. It should further be noted that the description made herein indifferently applies to semiconductor detectors or scintillators.

The selection of the thickness and of the surface area of the charge collection area of a semiconductor detector depends on the detection efficiency and on the expected sensitivity of the system. As a non-limiting example, a thickness smaller than one millimeter is sufficient to stop most of the low-energy photons (energy lower than 100 keV). However, for high-energy photons (energy greater than 100 keV), a thickness of a few millimeters or even of 1 cm may be necessary.

A detector of significant thickness enables to stop the largest possible number of photons but decreases the possible counting rate since the time of charge transit through the detector increases proportionally to the thickness thereof. In the case of a high-energy photon detection, a high bias voltage Vcc may be necessary to increase the efficiency of the detector while maintaining a short transit time. It should be noted that the selection of the semiconductor material forming the semiconductor wafer having block 10 defined thereon, as well as the dimensions of the charge collection area, will not be described in further detail herein. As a non-limiting example, the semiconductor material of the detector may be CdZnTe, or CdTeCl or CdTeIn crystals.

Photon detection device 1 thus comprises, between power supply terminal Vcc and a grounded terminal, a series association of a resistor 12 and of semiconductor block 10. The midpoint of the series association is connected to the input of local electronic circuit 2.

Local electronic circuit 2 behaves as a charge preamplifier. Circuit 2 comprises a first capacitor 16 having a first terminal connected to the input of circuit 2. The second terminal of capacitor 16 is connected to the input of an amplifier 18 having its output forming the output of local electronic circuit 2. Between the input and output terminals of amplifier 18 are placed, in parallel, a second capacitor 20 and a resistor 22. The output voltage of local circuit 2 is called Vout.

Electronic processing circuit 3 receives voltage Vout on its input. The input terminal of circuit 3 is directly connected to the positive terminal of a subtractor 24. The input terminal of circuit 3 is also connected to the input of a first delay line 26 of delay τ. The output of delay line 26 is connected to the input of an attenuator 28 (gain smaller than 1) having its output connected to the inverting input of subtractor 24. The output of subtractor 24 is connected to the input of a high-gain amplifier 30 (gain greater than 1) and the output of amplifier 30 is called energy signal E(t) and forms the output of electronic processing circuit 3.

Analog-to-digital converter 4 (ADC) converts analog signal E(t) into a digital signal S(t), sampled on a clock frequency.

Figure 2:
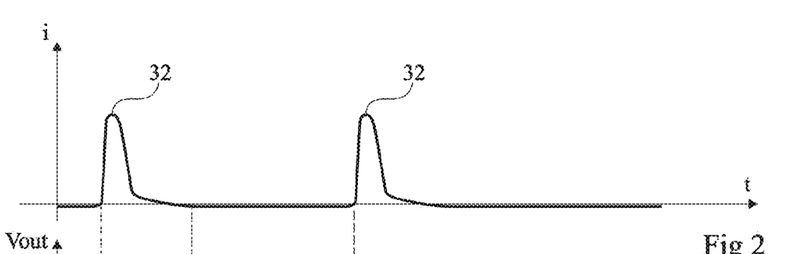
FIGS. 2, 3, and 4 are timing diagrams illustrating the operation of the spectrometer of FIG. 1.
Figure 3:
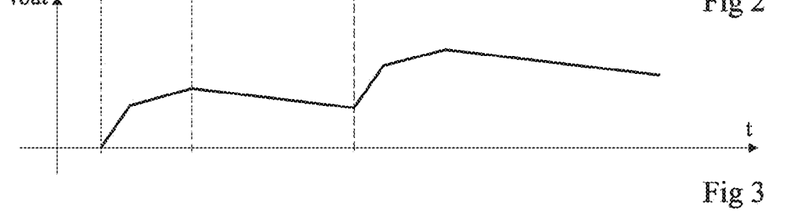
Figure 4:
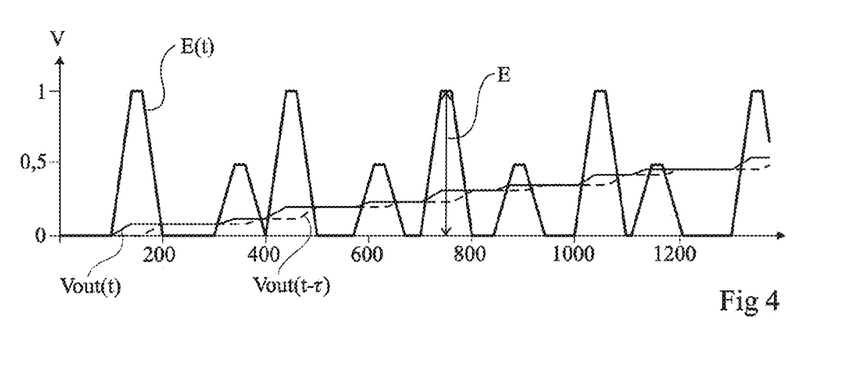

FIGS. 2, 3, and 4 are timing diagrams illustrating the operation of the device of FIG. 1. More particularly, FIG. 2 illustrates an example of signal i originating from photon detection device 1 (at the input of circuit 2), FIG. 3 illustrates the corresponding signal Vout, and FIG. 4 illustrates examples of signals Vout(t), Vout(t−τ) at the output of amplifier 28 and of the corresponding energy signal E(t).

On reception of a photon 14, many electron-hole pairs are generated in semiconductor block 10. The transfer of these electron-hole pairs is reflected by a current pulse 32 on output signal i(t). The quantity of transferred charges is a direct image of the energy of the incident photon, or more specifically of the energy released by the incident photon in the detector during an interaction.

Each time a pulse 32 appears on signal i(t), as can be seen in FIG. 3, output voltage Vout of local electronic circuit 2 increases and then, during a period of relaxation before another pulse, slightly decreases.

The amplitude of each of the increases of voltage Vout on occurrence of a pulse 32 directly corresponds to the quantity of charges photogenerated by the incident photon. Indeed, the amplitude of voltage Vout on occurrence of a current peak on signal i(t) is equal to the ratio of the quantity of charges formed by the photon which interacts in the detector pixel to the capacitance of capacitor 20.

However, as illustrated in FIG. 3, at the output of electronic local circuit 2, the information Vout corresponding to the energy of the detector photon is fugitive since the preamplifier discharges after the occurrence of the pulse (voltage Vout decreases between two pulses). Electronic processing circuit 3 measures the energy of the incident photon by measuring the amplitude of the increase of signal Vout, while avoiding the relaxation phase as will be described hereafter in relation with FIG. 4.

FIG. 4 shows an example of signal Vout(t). This drawing also illustrates the output signal of delay line 26, Vout(t−τ). FIG. 4 also illustrates the energy signal at the output of electronic processing circuit 3, E(t).

As can be seen in the timing diagram of FIG. 4, for each increase of the value of signal Vout, energy signal E(t) comprises a pulse having an amplitude proportional to the charge collected across detector 1, that is, proportional to the energy released by the photon detected in the semiconductor material. To obtain this effect, delay τ of first delay line 26 should be longer than the rise time of signal Vout. Indeed, this enables energy signal E(t) to reach a maximum value at the end of rise time Vout(t) before the beginning of the rise of signal Vout(t−τ). Energy signal E(t) is called energy signal since it is formed of pulses, each pulse corresponding to the detection of an interaction in the detector, and having an amplitude proportional to the quantity of charges collected during the interaction.

It should be noted that the accurate determination of delay τ of delay line 26 will not be detailed any further herein and is within the abilities of those skilled in the art by successive adjustments of the operation of electronic processing circuit 3.

Energy signal E(t) is then digitized with an analog-to-digital converter 4, and signal S(t) is connected to the input of a processing device such as a FPGA or an ASIC circuit to detect the maximum values of this digital signal and form the spectrometer.

Figure 5:
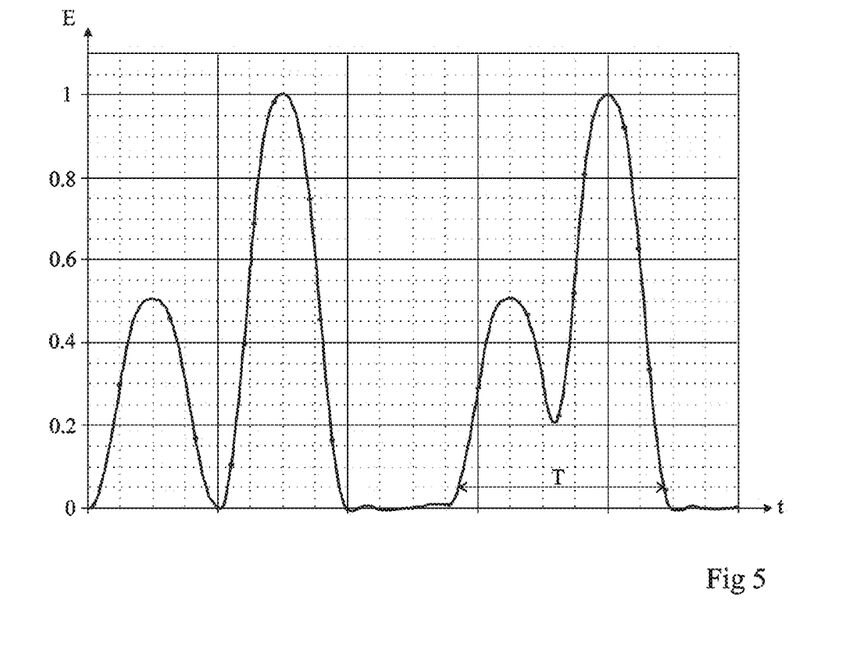
FIG. 5 illustrates a pulse overlap phenomenon which may appear with the device of FIG. 1.

FIG. 5 shows an example of an energy signal E(t) capable of being obtained by means of the device of FIG. 1 and a disadvantage of such a circuit.

Indeed, in a circuit such as provided hereabove, the occurrence of pulses on signal i(t) is random. Thus, pulses may appear to be very close to each other, which implies an overlapping of the pulses obtained on energy signal E(t), as can be seen in FIG. 5, and thus on sampled signal S(t).

If the clock frequency of the analog-to-digital converter is low, or if the overlapping pulses are very close, the overlaps may bring about parasitic measurements. Such measurements correspond to the accumulation of the energies released by too close interactions. To eliminate such parasitic measurements, it may be provided to compare energy signal E(t) with a positive threshold close to zero and to measure the duration of energy signal E(t) when it is greater than this threshold. If this duration exceeds a threshold duration, as for example in FIG. 5 for the last double pulse which has a duration T, the measurement is eliminated and the maximum voltage measured on signal S(t) is eliminated from the spectrometer.

A disadvantage of such a method is that, when many pulses corresponding to arrivals of photons are very close in time, a large number of measurements may be eliminated from the spectrometer. The measurements may thus be distorted by such a selection.

Further, another disadvantage of devices provided up to now is that they require using particularly high-power analog-to-digital converters operating at high sampling frequencies to process all the information contained in energy signal E(t) sufficiently fast.

It is here provided to modify the analog circuit located upstream of the analog-to-digital converter so that it only converts the information corresponding to peaks on energy signal E(t). Further, a circuit enabling to do away with the above-mentioned overlap problems is provided.

Figure 6:
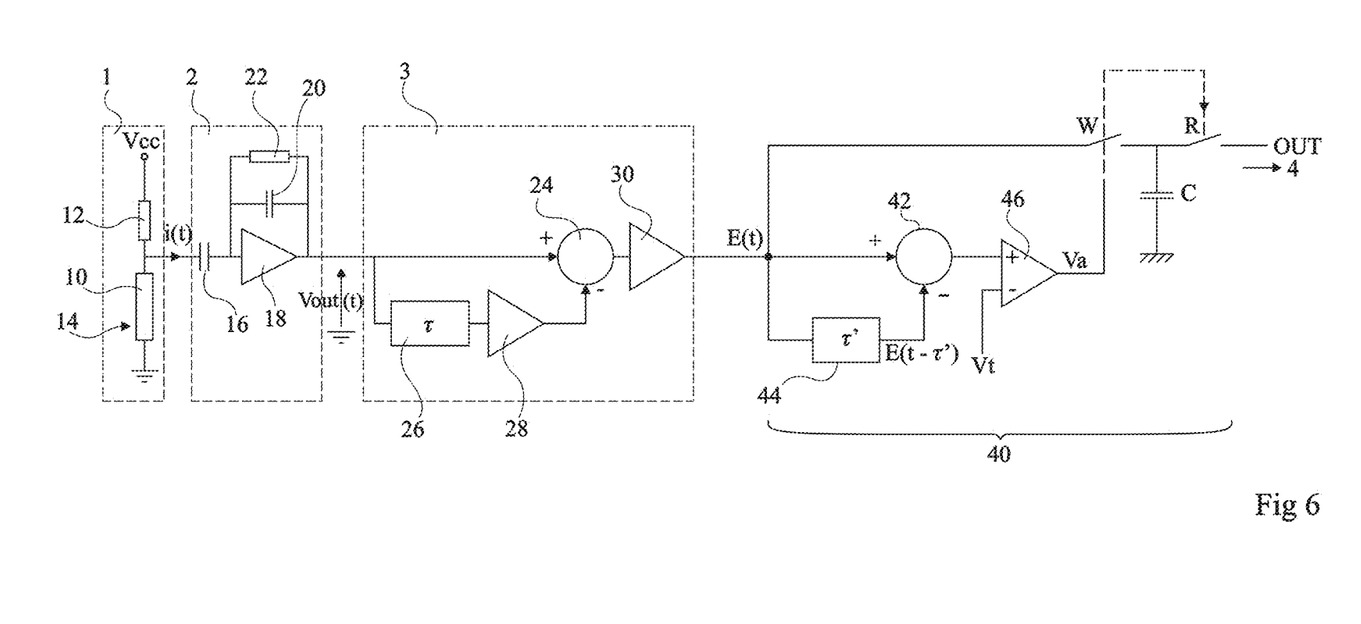
FIG. 6 illustrates a detector and its associated electronic circuit according to an embodiment.

FIG. 6 illustrates a spectrometer comprising an electronic circuit solving this problem.

The device of FIG. 6 comprises, in the same way as the device of FIG. 1, a photon detection device 1, a local electronic circuit 2, and an electronic processing circuit 3.

Thus, the electronic circuit connected to the detector comprises:
- a local circuit 2, or preamplifier, delivering pulses Vout(t) under the effect of the charge collection across the detector, as a response to an interaction in the detector; and
- an electronic processing circuit 3, arranged downstream of local circuit 2, capable of generating an energy signal E(t), formed by pulses having an amplitude depending on the quantity of charge collected during each interaction.

Further, electronic processing circuit 3 further comprises:
- a first delay line circuit 26 for shifting in time a pulse Vout(t) generated by preamplifier 2, this circuit being capable of generating a pulse time-shifted by a delay τ, Vout(t−τ); and
- a first subtractor 24, capable of generating the difference between pulse Vout(t) and time-shifted pulse Vout(t−τ), this first subtractor being capable of delivering an energy signal E(t) having its amplitude depending on the quantity of charge having generated pulse Vout(t).

The electronic circuit connected to the detector further comprises an analog circuit 40 having its input connected to energy signal E(t) of electronic processing circuit 3 and having its output OUT provided to be connected to the input of an analog-to-digital converter (not shown in FIG. 6).

Circuit 40 comprises a subtractor 42 having its non-inverting input receiving energy signal E(t). The inverting input of subtractor 42 receives energy signal E(t) delayed by a delay τ', here called delayed energy signal E(t−τ'). This delayed signal is obtained by means of a second delay line 44 having its input connected to output E(t) of block 3.

The output of subtractor 42 is connected to the non-inverting terminal of an operational amplifier 46 assembled as a comparator, the inverting terminal of operational amplifier 46 being connected to a generator of a threshold voltage Vt, negative and close to zero. Threshold voltage Vt is selected to be smaller than the noise voltage present at the output of subtractor 42, to avoid untimely starts in the absence of a detected interaction.

Output Va (called control signal) of operational amplifier 46, assembled as a comparator, controls a first write switch W (for example, via a separate control device).

First write switch W enables to connect circuit 3 for generating energy signal E to a capture circuit, the capture circuit being capable of capturing the value taken by energy signal E(t) at a capture time. The capture circuit may be intended to store this value, in which case it acts as a storage circuit. The value may for example be stored until it is digitized by an analog-to-digital converter arranged downstream of the capture circuit. The capture circuit may also be a circuit for digitizing the stored value, with no prior storage.

In the example shown in FIG. 6, a first terminal of first write switch W is connected to output E(t) of circuit 3 and a second terminal of first write switch W is connected to a first electrode of a capacitor C having its second electrode connected to ground. The second terminal of first write switch W is also connected to a first terminal of a second read switch R having its second terminal forming output terminal OUT of circuit 40. Output OUT may be connected to secondary processing circuits, for example, an analog-to-digital converter.

Figures 7A, 7B:
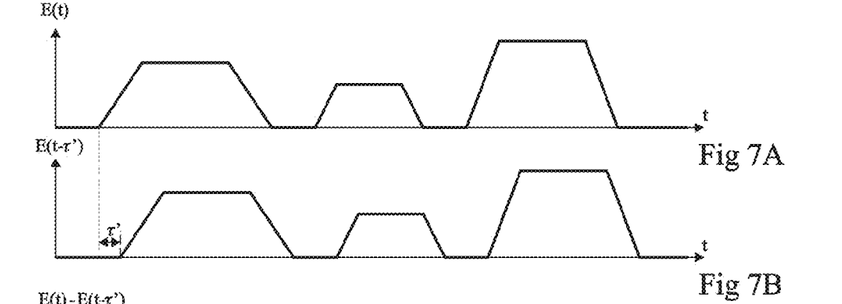
FIGS. 7A to 7E illustrate the operation of the device of FIG. 6.

The operation of the device of FIG. 6 will be described hereafter in relation with the timing diagrams of FIGS. 7A to 7E. More particularly, the timing diagram of FIG. 7A illustrates an example of an energy signal E(t), the timing diagram of FIG. 7B illustrates an example of the signal at the output of delay line 44 (E(t−τ')), the timing diagram of FIG. 7C illustrates the signal at the output of subtractor 42 (E(t)−E(t−τ')), the timing diagram of FIG. 7D illustrates control signal Va at the output of operational amplifier 46, and the timing diagram of FIG. 7E illustrates the state of first write switch W.

In the shown example, energy signal E(t) (FIG. 7A) has three successive pulses of different durations and amplitudes, corresponding to three different interactions in the detector. Unlike what is shown in the timing diagram, the rise and fall times of the pulses are negligible; they are illustrated in the timing diagrams at being relatively long for a better understanding. The signal on the timing diagram of FIG. 7B is identical to the signal on the timing diagram of FIG. 7A except that it is shifted in time by delay τ'.

Figure 7C:
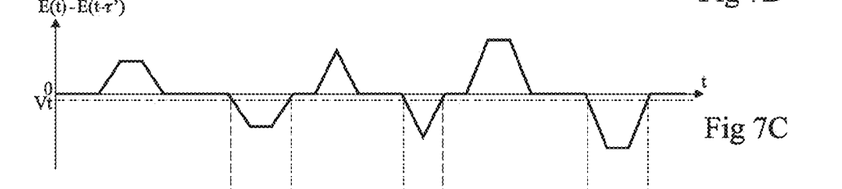
Figures 7D, 7E:
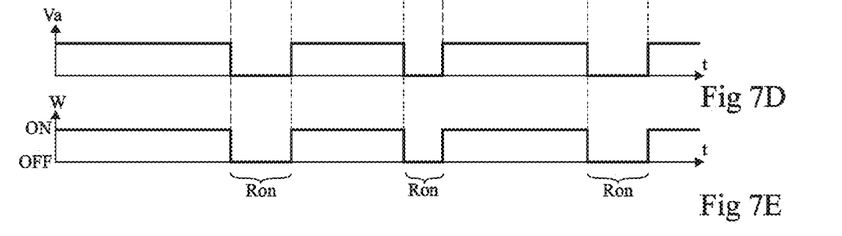

As can be seen in FIG. 7C, for each start of pulse on signal E, the output signal of subtractor 42 becomes positive. Each time signal E decreases, the output signal of subtractor 42 becomes negative.

Threshold Vt is selected to be negative and close to 0 to detect the times when the output voltage of the delay line becomes negative (end of pulse on energy signal E(t)). This implies for control signal Va to be at 1 until the beginning of each falling edge of energy signal E(t) at the end of a pulse. Control signal Va is then at zero, when signal E(t−τ') starts decreasing, and switches back to 1 each time a pulse is awaited again on signal E.

This operation implies for write switch W to be on (ON) until the end of each pulse period, and then off (OFF), and to turn back on once the signal delayed by block 44 returns to a high state.

It should be noted at, to replace an operational amplifier assembled as a comparator 46 as described hereabove, it may also be provided to use a hysteresis-assembled operational amplifier 46. The latter will be provided so that its output Va switches to zero for each end of pulse on energy signal E(t) and switches back to 1 for each start of pulse on energy signal E(t), that is, when the output signal of subtractor 42 becomes positive again. It should be noted that the operation of the device provided herein is similar in the case where comparator 46 is replaced with a hysteresis comparator.

As illustrated in FIG. 7E, during phases when write switch W is off (OFF), it is provided to turn on read switch R (Ron) so that it ensures the reading of the charge stored in capacitance C by the analog-to-digital converter, or any other processing circuit placed at the device output. To achieve this, second read switch R may be provided to be simultaneously turned off on turning on of first write switch W or to be controlled independently by the control device.

In other words, capacitance C acts as an analog memory having its write phase corresponding to the capture of a value of energy signal E(t) according to control signal Va(t), the latter controlling the turning off of write switch W at a capture time, the capture time corresponding to the time at which energy signal E(t) reaches a maximum. Thus, the analog memory stores signal Emax(t) which corresponds to the maximum amplitude of a pulse formed by energy signal E(t). As previously indicated, value Emax(t) is proportional to the energy of the detected interaction.

Write switch W is then maintained off until the memory is read from, that is, until read switch R is turned on, the signal being then transmitted to an external processing circuit, for example, an analog-to-digital converter.

It should be noted that, for circuit 40 to operate properly, delay τ' should be selected to be very low, typically smaller than 10 ns, and preferably in the range from 5 to 10 ns. Delay τ' is preferably at least twice smaller than the rise time of signal Vout. For example, if the rise time of Vout is 10 ns, one selects τ'<5 ns, for example τ'=1 ns.

Thus, generally, the electronic circuit connected to the detector comprises, downstream of previously-described processing circuit 3:
a first switch W for transmitting energy signal E(t) to a downstream processing circuit, such as an analog-to-digital converter;
a circuit for controlling the first switch capable of generating a switch control signal Va, according to the time variation of energy signal E(t).

Further, the control circuit comprises:
a second delay line circuit 44 to shift in time energy signal E(t) delivered by processing circuit 3 and generate a time-shifted energy signal E(t−τ');
a second subtractor 42 capable of generating a signal representing the difference between energy signal E(t) and time-shifted energy signal E(t−τ'); and
a comparator 46 capable of generating a control signal Va(t) according to the difference between energy signal E(t) and time-shifted energy signal E(t−τ'), this difference representing the time variation of signal E(t).

Control signal Va is intended to activate a capture circuit when the time variation reaches a predetermined value. In the shown example, the capture circuit is activated when the energy signal is maximum. Further, the capture circuit comprises an analog memory C capable of storing a value of energy signal E(t) at the time when the amplitude thereof is maximum. This time may be called capture time. Thus, the circuit comprising delay line 44, subtractor 42, and comparator 46 delivering signal Va form a pulse detection circuit having its output used to control switch W of the capture element.

To further improve the structure for storing the data originating from the device of FIG. 6, it may also be provided to use, rather than a single association of a write switch W and of a read switch R surrounding a storage capacitor C, an assembly of a plurality of similar storage structures in parallel, which may be coupled to a same pulse detection circuit. This may in particular enable to store a larger number of data received in parallel and to use an analog-to-digital converter associated with a synchronized read system reading the voltage states stored in each of the capacitances one after the other.

Figure 8:
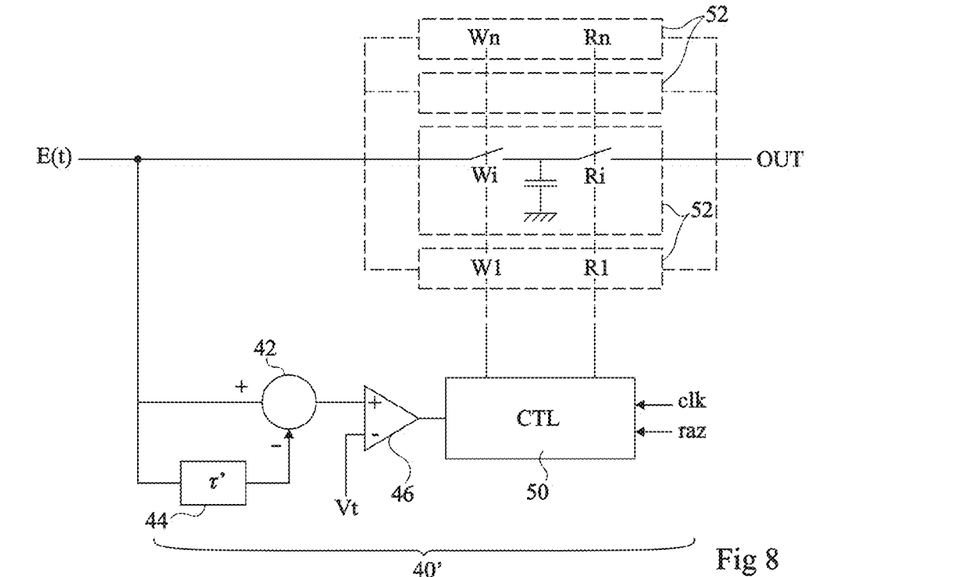
FIG. 8 illustrates a variation of the device of FIG. 6.
Figure 9A:
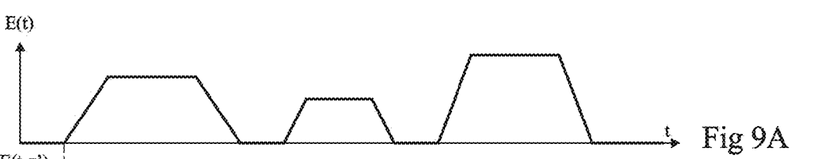
FIGS. 9A to 9J illustrate the operation of the device of FIG. 8.
Figure 9B:
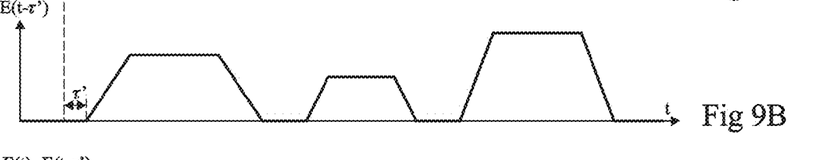
Figure 9C:
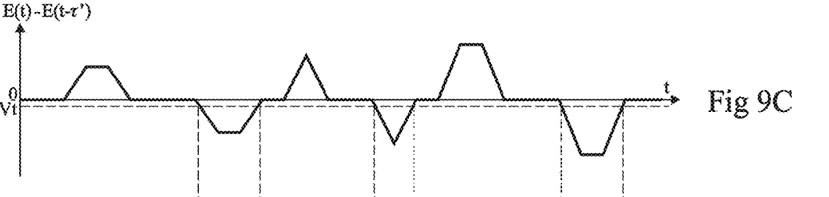
Figures 9D, 9E:
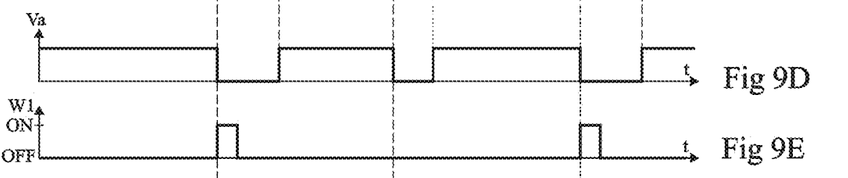
Figures 9F, 9G:
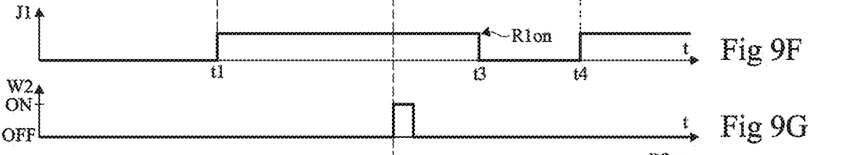
Figures 9H, 9I:
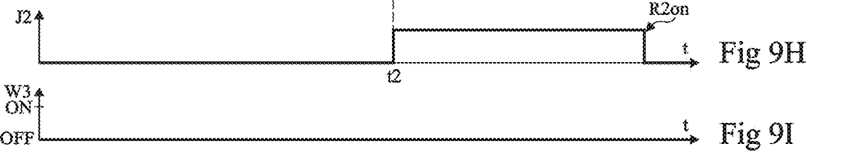
Figure 9J:
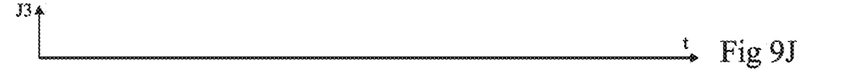

This improved device is shown in FIG. 8. More particularly, FIG. 8 only shows a block 40' placed to replace block 40 of FIG. 6.

In the variation of FIG. 8, control signal Va is not used to directly control a write switch W, but at the input of a controller or control device 50 (CTL). Controller 50 also receives a clock input clk, and a reset input, raz. Advantageously, clock input clk may be the same as that used to synchronize the analog-to-digital converter connected to output OUT of the device.

In this variation, the memory cell formed of switch W, switch R, and capacitance C is replaced with an assembly of memory cells 52 formed in parallel. Each memory cell comprises an input switch Wi (i∈[1, . . . , n]) and an output switch Ri connected to a first electrode of a capacitor Ci having its second electrode connected to ground. Switches Wi are connected to the terminal receiving energy signal E(t) and switches Ri are connected to output OUT.

Controller 50 controls the activation of the assembly of switches Wi and Ri. Memory cells 52 in the form of a FIFO (First In First Out) queue are provided to operate the assembly. Each time control signal Va switches to the low state, controller 50 is provided to leave off (OFF) the set of write switches Wi except for one of them. Thus, the state of energy signal E(t) at this time is stored in the corresponding capacitance Ci. Switch Wi is then turned off and the memory cell of rank i stores the maximum value on energy signal E(t) during the pulse. In other words, control signal Va generated by circuit 40 drives the state of switches Wi via control device 50.

On occurrence of the next pulse, that is, when control signal Va switches back to the low state, another memory cell 52 is activated so that the maximum value of the pulse on energy signal E(t) is stored in another capacitance Cj.

On the read side, that is, on the side of switches Ri, it is provided for the switches to be turned off synchronously with clock signal clk so that the analog-to-digital converter placed at the device output only reads a single piece of the data stored in capacitors Ci at once, and this for each clock pulse clk.

A more complex system where each memory cell 52 is associated with an occupancy indicator Ji may also be provided. Occupancy indicator Ji is in a first state, for example, in the high state, when a piece of data is stored in the corresponding capacitance Ci, and in a second state, for example, in the low state, when no data is stored in the associated capacitance.

On each writing into one of capacitances Ci, that is, for each activation of a switch Wi, the corresponding signal Ji switches to the high state. For each step of reading from this memory cell which has been written into, that is, each time the associated switch Ri is turned on, signal Ji switches to the low state. Thus, the controller may manage the occupancy of the different memory cells so that only the occupied memory cells are read from and send the data stored into the corresponding capacitance Ci towards the analog-to-digital converter (output OUT).

Advantageously, the arranging in parallel of the assembly of memory cells provided in FIG. 8 enables the analog-to-digital converter to synchronously read the maximum values of different pulses on energy signal E(t), which are images of the energies of the considered photons. As seen previously, the pulses detected by photon detection device 1 may be at a variable distance from one another. The use of a queue formed of a plurality of memory cells 52 enables to resynchronize the pulses on the clock signal of the analog-to-digital converter. Further, by properly sizing the queue formed by memory cells 52, a particularly high-performance device where the assembly of memory cells is successively filled and emptied is obtained.

Advantageously, the device provided herein enables to use an analog-to-digital converter connected to output OUT having dimensions compatible with the forming of a complete device having a surface area smaller than a few square millimeters. Indeed, it is not necessary to associate the device provided herein with a high-performance analog-to-digital converter since signal E is not entirely converted into a digital signal: only the values stored in the memory cells 52 which are a direct image of the energy of the received photons are converted, to form a spectrometer of the incident ionizing radiation beam.

FIGS. 9A to 9J show timing diagrams illustrating the operation of the device of FIG. 8. More specifically, the timing diagrams of FIGS. 9A to 9D are the same as the timing diagrams of FIGS. 7A and 7D and the timing diagrams of FIGS. 9E to 9J respectively illustrate the state of switch W1, of occupancy indicator J1, of switch W2, of occupancy indicator J2, of switch W3, and of occupancy indicator J3.

As illustrated in these timing diagrams, when control signal Va has a falling edge, that is, the signal at the output of subtractor 42 passes below threshold Vt, the controller controls switch W1 to the on state (high state ON). This enables to store the state of signal E on capacitance C1 of the first memory cell. At the same time t1, occupancy signal J1 switches to the high state. At a time t2, control signal Va has a second falling edge. Since the occupancy signal of the first memory cell is in the high state, the instead of turning off switch W1, the controller turns off switch W2 to store the maximum value of the pulse of signal E in the second memory cell. At the same time t2, the occupancy signal of second memory cell J2 switches to the high state.

At a time t3, the first memory cell is read from. Switch R1 is on and occupancy signal J1 switches to the low state. At a time t4, control signal Va has a third falling edge. Since the first memory cell is free (J1=0), the controller makes switch W1 turn back on, to store a new maximum pulse value of signal E into capacitor C1 of first memory cell 52.

Thus, according to this embodiment, the storage circuit 40 comprises a buffer memory 52 formed of n analog memory cells, n being an integer greater than or equal to 1, having data stored into it during a write phase, the reading from the cells of the buffer memory being rated by the clock frequency of the analog-to-digital converter and performed synchronously with the writing.

Advantageously, the device provided herein provides an electronic architecture adapted to an operation with a very strong photon flow.

Further, due to the use of a particularly simple analog-to-digital converter, this device is also compatible with photon detector structures where each pixel is divided into sub-pixels. Indeed, when the incident flow is greater than 2.107 photons/mm2/s, the processing electronic system saturates since the current pulses originating from the detector are too close and become indistinguishable. The initial pixel may thus have to be divided into sub-pixels and each sub-pixel may have to be associated with a separate electronic processing system.

Such a separation of the pixel into sub-pixels translates as an increase in the size of the complete electronic system. Indeed, each sub-pixel should be associated with a complete processing electronic system.

By using the circuit 40 or 40' provided herein, associated with a conventional analog-to-digital converter, the integration of such an electronic system in a surface area smaller than 2 mm2 is possible.

Also, circuits 40 and 40' provided herein may be easily used in relation with each of the sub-pixels and be associated with a single analog-to-digital converter. In this case, the outputs of the memory cells of each of the sub-pixels are formed on a same output OUT which is the output of the general pixel. In such a sub-pixelization variation, the controller is provided to read from a single memory of each of the sub-pixels at a time.

It should be noted that the practical forming of the controller will not be described in further detail herein, since it is relatively conventional in microelectronics.

Further, the forming of a second delay line 44 to select the times of storage of energy signal E(t) into the memory cells enables to avoid a loss of information during pulse overlaps. Indeed, the association of a delay line 44 of small delay and of a subtractor 42 provides a signal at the output of subtractor 42 substantially corresponding to the variation of energy signal E(t). The times when the pulse peaks appear can thus be more easily detected (times when the variation becomes negative). The device provided herein is thus capable of making the most of all pulses, and even of those which overlap.

Specific embodiments have been described. Various alterations, modifications, and improvements will occur to those skilled in the art. Particularly, the circuit provided herein comprises amplifiers, comparators, and subtractors having terminals which may be inverted with respect to what has been described, the comparison threshold voltages or the processing operations carried out at the output of these elements being accordingly adapted. Further, the occupancy signals provided herein may also operate reversely to what has been described.

The invention claimed is:

1. A device for processing data delivered by a photon detector, comprising:
a first analog circuit capable of generating, on a first node, a first signal having a series of pulses, each pulse having an amplitude proportional to energy released by an interaction of a photon in the photon detector;
a second analog circuit configured to provide a second signal switching from a first state to a second state upon detection of a decrease of the amplitude of the first signal; and
a capture element comprising a plurality of capacitors and a plurality of write switches, each capacitor of the plurality of capacitors having a first electrode connected to the first node via a write switch of the plurality of write switches and a second electrode connected to a node of application of a reference voltage, the capture element further comprising a control circuit configured to receive the second signal, the control circuit being capable of controlling the write switches to record a value of the first signal into one of the capacitors when the second signal switches from the first to the second state.

2. The device of claim 1, wherein the plurality of capacitors have their first electrodes connected to a second node via a plurality of read switches.

3. The device of claim 2, further comprising an analog-to-digital converter capable of receiving a value provided on the second node.

4. The device of claim 2, wherein the control circuit is capable of controlling the plurality of read switches to periodically provide on the second node one of the values recorded into the plurality of capacitors.

5. The device of claim 1, wherein an occupancy indicator is associated with each capacitor of the capture element.

6. The device of claim 5, wherein the control circuit is capable of controlling the plurality of write switches to record the value of the first signal into one of the capacitors associated with an occupancy indicator in a free state, when the second signal switches from the first state to the second state.

7. The device of claim 1, wherein the control circuit is capable of operating the plurality of capacitors as a FIFO-type queue.

8. The device of claim 1, wherein the second analog circuit comprises a subtractor having its inputs receiving the first signal and the first signal delayed by a predetermined delay ($\tau'$) by a delay line, an output of the subtractor being connected to a first input of a comparator having a second input receiving a reference voltage.

9. The device of claim 8, wherein the predetermined delay ($\sigma'$) is shorter than 10 ns.

10. The device of claim 8, wherein the output of the comparator delivers the second signal.

11. A device for processing data delivered by a photon detector, comprising:
- a first analog circuit capable of generating, on a first node, a first signal having a series of pulses, each pulse having an amplitude proportional to energy released by an interaction of a photon in the photon detector;
- a second analog circuit configured to provide a second signal switching from a first state to a second state at a time that is based upon a difference between the first signal and a delayed version of the first signal; and
- a capture element comprising a plurality of capacitors and a plurality of write switches, each capacitor of the plurality of capacitors having a first electrode connected to the first node via a write switch of the plurality of write switches and a second electrode connected to a node of application of a reference voltage, the capture element further comprising a control circuit configured to receive the second signal, the control circuit being capable of controlling the write switches to record a value of the first signal into one of the capacitors when the second signal switches from the first to the second state.

12. The device of claim 11, wherein the plurality of capacitors have their first electrodes connected to a second node via a plurality of read switches.

13. The device of claim 12, further comprising an analog-to-digital converter capable of receiving a value provided on the second node.

14. The device of claim 12, wherein the control circuit is capable of controlling the plurality of read switches to periodically provide on the second node one of the values recorded into the plurality of capacitors.

15. The device of claim 11, wherein an occupancy indicator is associated with each capacitor of the capture element.

16. The device of claim 15, wherein the control circuit is capable of controlling the plurality of write switches to record the value of the first signal into one of the capacitors associated with an occupancy indicator in a free state, when the second signal switches from the first state to the second state.

17. The device of claim 11, wherein the control circuit is capable of operating the plurality of capacitors as a FIFO-type queue.

18. The device of claim 11, wherein the second analog circuit comprises a subtractor having its inputs receiving the first signal and the first signal delayed by a predetermined delay ($\sigma'$) by a delay line, an output of the subtractor being connected to a first input of a comparator having a second input receiving a reference voltage.

19. The device of claim 18, wherein the predetermined delay ($\sigma'$) is shorter than 10 ns.

20. The device of claim 18, wherein the output of the comparator delivers the second signal.

* * * * *